United States Patent [19]
Leistritz

[11] 3,989,469
[45] Nov. 2, 1976

[54] THERMIC AFTERBURNING AND MUFFLING APPARATUS FOR INTERNAL COMBUSTION ENGINES

[75] Inventor: Hans Karl Leistritz, Kussaberg, Germany

[73] Assignee: Anstalt fur Verbrennungsmotoren, Prof. Dr. h.c. Hans List, Austria

[22] Filed: June 7, 1974

[21] Appl. No.: 477,345

[30] Foreign Application Priority Data
June 12, 1973 Germany............................ 2329824
Aug. 1, 1973 Germany............................ 2338886

[52] U.S. Cl................................ 23/277 C; 60/303;
60/298; 60/320; 181/36 C; 423/212
[51] Int. Cl.²......................... F01N 3/14; F23G 7/06
[58] Field of Search............. 23/277 C; 60/303, 298, 60/320

[56] References Cited
UNITED STATES PATENTS

| | | | |
|---|---|---|---|
| 1,839,880 | 1/1932 | Hyatt | 23/277 C |
| 3,188,798 | 6/1965 | Jackson et al. | 23/277 C |
| 3,197,956 | 8/1965 | Clarke et al. | 23/277 C |
| 3,254,963 | 6/1966 | Leistritz | 23/277 C |
| 3,347,040 | 10/1967 | Leistritz | 60/303 X |
| 3,603,081 | 9/1971 | McCrocklin | 23/277 C |

*Primary Examiner*—James H. Tayman, Jr.
*Attorney, Agent, or Firm*—Watson, Cole, Grindle & Watson

[57] ABSTRACT

An apparatus according to the invention utilizes an elongated combustion chamber at least partially surrounded by a cooling air chamber receiving cooling air, directing a portion of the heated cooling air into the combustion chamber, and discharging the remaining heated cooling air into the atmosphere. A number of separated ducts discharge afterburned exhaust gas and are connected to a combustion chamber discharge pipe. Each duct has a wall forming a joint heat exchange surface with the cooling air chamber and the openings of the ducts into the atmosphere are separate from the air chamber opening. The ducts may each be formed of a corrugated metal shell with the corrugation peaks connected with the exterior wall of the cooling air chamber.

5 Claims, 6 Drawing Figures

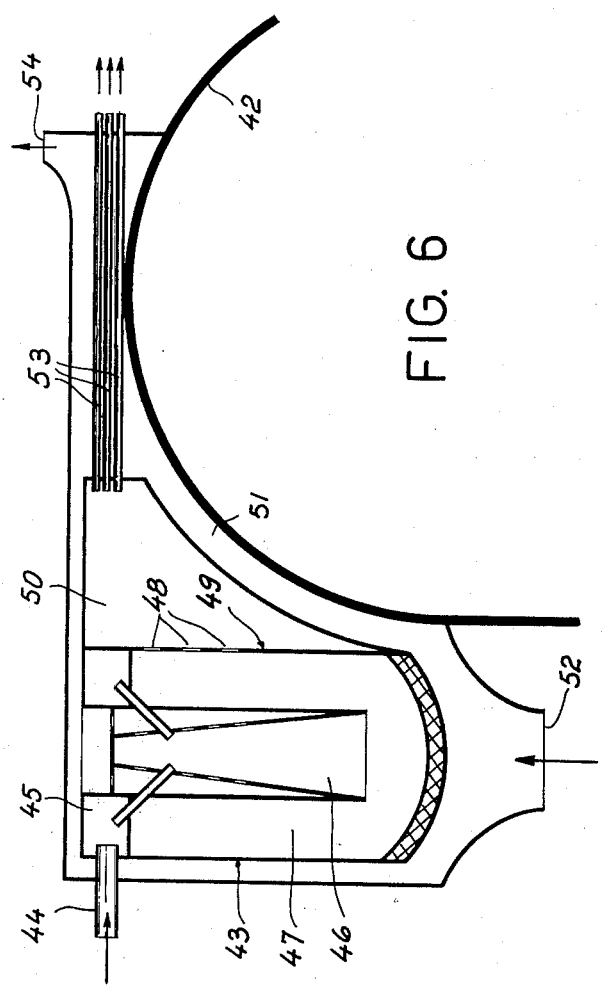

THERMIC AFTERBURNING AND MUFFLING APPARATUS FOR INTERNAL COMBUSTION ENGINES

BACKGROUND OF THE INVENTION

This invention relates to apparatus for the thermic or non-catalytic afterburning of exhaust gases and the simultaneous muffling of internal combustion engines.

It is known to arrange exhaust gas afterburning devices in the exhaust system of internal combustion engines, especially motor vehicle engines, to burn the exhaust gas before its discharge into the atmosphere to decrease as much as possible the portion of the harmful substances contained in the exhaust gas, especially carbon monoxide and unburned hydrocarbons.

In known thermic afterburning devices, the exhaust gas to be afterburned enters into an essentially tube-shaped combustion chamber from an exhaust pipe. The exterior side of the combustion chamber is surrounded by a shell space which is supplied with cooling air from a blower, for example. The downstream end of the cooling air shell opens into the atmosphere and is connected with the combustion chamber in such a way that heated cooling air flows into the combustion chamber as additional or secondary air for the afterburning of the exhaust gas. The hot afterburned exhaust gas is carried off from the combustion chamber over a relatively long pipe which is connected to it. Such afterburner construction has the disadvantage that the afterburned gas enters the atmosphere at an extremely high temperature of, for example, 500° – 800° C, and the entire device is relatively long. Also known are thermic afterburning devices in which the afterburned exhaust gas exits from an annularly-shaped combustion chamber, and is limited by the combustion chamber and a housing shell surrounding the combustion chamber flows along the combustion chamber to the end opposite the end where it entered and discharges into the atmosphere. Here, the housing shell is only cooled by the ambient air. In such a construction, the afterburned exhaust gas flowing along the combustion chamber maintains high temperatures in the combustion chamber walls which assists the afterburning of the exhaust gas, but there is also the disadvantage that the afterburned exhaust is discharged into the atmosphere at a high temperature. Additionally, the afterburner is expensive because the housing shell surrounding the combustion chamber has to withstand high temperatures and must therefore be made of an expensive high-temperature resistant material.

SUMMARY OF THE INVENTION

The invention provides a constructively simple and practicable afterburning apparatus with a high thermic efficiency which, as a compact unit, can be connected at any location into the exhaust system of an internal combustion engine, and avoids the described disadvantages of the known constructions. The afterburning apparatus must be constructed so that the afterburned exhaust gas enters the atomsphere at a relatively low temperature; the apparatus must also ensure good muffling.

The invention apparatus achieves thermic afterburning of the exhaust gases and the simultaneous muffling thereof for internal combustion engines, especially automobile engines. An essentially pipe-shaped combustion chamber is located in the exhaust system of the internal combustion engine and is provided with the exhaust gas to be afterburned and additional air for combustion. A cooling air shell surrounds the combustion chamber over at least a part of its axial extent and is supplied with cooling air by a blower. Heated cooling air is discharged into the atmosphere from the cooling air shell and a part of the heated cooling air is directed into the combustion chamber as additional air for combustion. According to the invention, the afterburning device is characterized by connection of a combustion chamber discharge pipe with a number of ducts which are separated from each other and have a relatively small profile for the discharge of the afterburned exhaust gas, in which case the wall of each duct, over at least one part of its circumference, has a joint heat exchange surface with the cooling air shell surrounding the combustion chamber and in which case the ducts and the cooling air shell discharge into the atmosphere separately.

The apparatus according to the invention enables the afterburned gas to excharge heat with the cooling air shell over a large total surface and transfers a considerable part of its heat to the cooling air so that it enters the atmosphere at a relatively low temperature of 300° C, for example. The heat exchange between the afterburned exhaust gas and the cooling air causes a good preheating of the additional air for combustion diverted from the cooling air shell and thus the efficiency of the combustion is improved. Since, in the invention, the walls of the ducts carrying the afterburned exhaust gas do not reach very high temperatures, low-cost materials can be used for the production of these ducts. The discharge of the afterburned exhaust gas over several ducts with small profiles simultaneously also ensures a good muffling.

In the case of a preferred construction of the invention, the ducts for the discharge of the afterburned exhaust gas, which are preferably evenly distributed over the circumference of the combustion chamber, are located in an axial direction from the level of the opening of the combustion chamber outlet pipe essentially parallel to the axis of the combustion chamber in that end of the combustion chamber removed away from the outlet pipe, where the ducts open into the atmosphere. The ducts are cooled by the cooling air preferably in a counterflow arrangement. This construction, in spite of the advantageously long carrying-off routes for the afterburned exhaust gas, is contained in a compact structure and reduces the heat radiation of the device over its whole longitudinal extent.

The afterburning device is especially advantageous with a counterflow type combustion chamber and when it is surrounded by a shell space for directing the exhaust gases to be afterburned by the combustion chamber over at least one part of its axial extent. The shell space preferably has a joint heat exchange surface with the ducts for the discharge of the afterburned exhaust gas. This construction makes it possible for the supplied exhaust gas, which is to be afterburned, to withdraw heat from the combustion chamber and possibly also from the discharged afterburned exhaust gas and is therefore brought to a thermally advantageous combustion temperature. Thus, in the case of low temperature primary exhaust gas, and efficient operation of the afterburning device results. Also, a direct cooling of the combustion chamber by the supplied exhaust gas is obtained.

It is especially advantageous for the muffling of exhaust gases if, according to another characteristic of the invention, the combustion chamber outlet pipe with overflow-off openings provided at its circumference, which act as restrictors, and preferably over an annulus surrounding these openings, which acts as an expansion chamber, is connected with the afterburned gas discharge ducts.

In another preferred practical construction of the invention, a corrugated-metal covering is located in the annulus between two coaxial pipe walls, the interior one of which also forms an exterior wall of the combustion chamber, for instance, the exterior wall of the shell space surrounding the combustion chamber for the supply of the exhaust gas. This corrugated-metal covering is connected with the pipe walls at the peaks of the corrugations to form two duct channels, one of which is used for the discharge of the afterburned exhaust gas, whereas the other one forms the cooling air shell. This construction enables a simple and low-cost production of the afterburning device.

OBJECTS OF THE INVENTION

It is a primary object of the present invention to provide an improved thermic type afterburning and muffling apparatus for internal combustion engines which is more efficient and compact than known apparatus.

It is another object of the invention to reduce the temperature of the exhaust gases egressing from an afterburner and muffler apparatus.

Another object of the invention is to reduce the complexity and cost of afterburning and muffling devices used with internal combustion engines.

BRIEF DESCRIPTION OF THE FIGURES

Other characteristics, objects and advantages of the invention are further explained in the following description in conjunction with the drawings wherein:

FIG. 6 is a schematic sectional view of a vehicle showing another embodiment of the invention.

DETAILED DESCRIPTION

Figure 1:
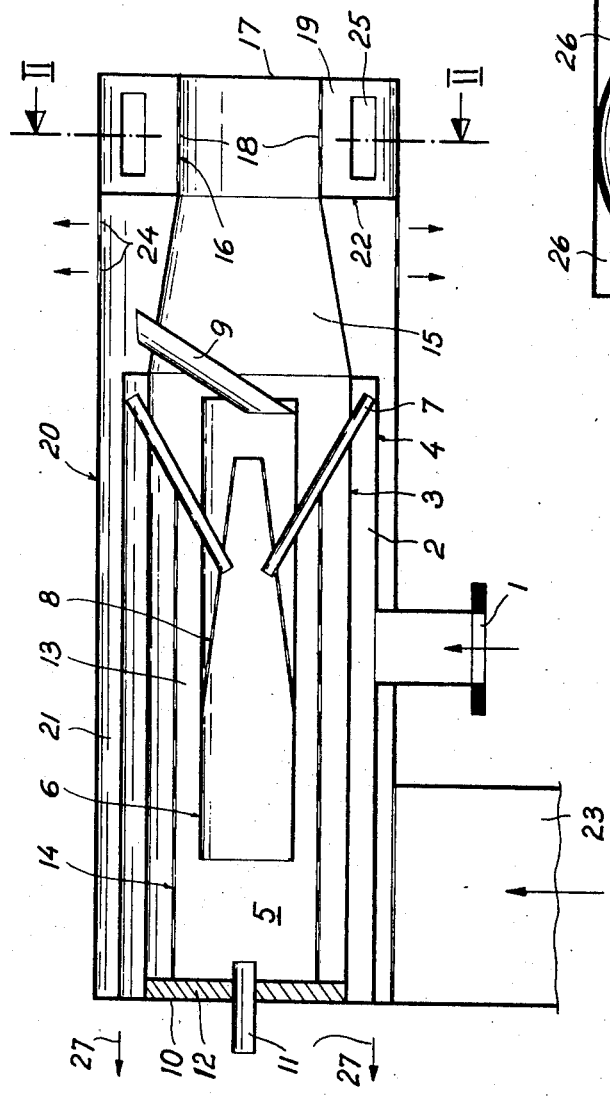
FIG. 1 is a longitudinal section of an afterburning device according to the invention.

The afterburning device shown in FIG. 1 is connected to the exhaust gas outlet or to an exhaust pipe of an internal combustion engine (not shown). The exhaust gas to be afterburned, the temperature of which fluctuates within a wide range of 20° to 700° C, according to the operating condition of the internal combustion engine, passes through port 1 and enters into shell space 2 which is closed at both ends. Shell space 2 is limited by two coaxial cylindrical pipes 3, 4. As shown in the Figure, port 1 runs vertically within respect to the axis of shell space 2 and away from exterior pipe 4. Interior pipe 3 forms the wall of a reverse scavenging or counterflow combustion chamber 5 and surrounds combustion jet 6 which is open at one end. From the right end in FIG. 1 of exhaust gas shell space 2, two pipes 7 having a small diameter are diametrically opposite each other and are sloping with regard to the longitudinal axis of the device to extend into the interior of combustion jet 6. Pipes 7, through which the exhaust gas to be afterburned reaches combustion jet 6 from shell space 2, open out into combustion jet 6 in the center section of the wall of apertured partition 8 which is conically enlarged in the direction of the flow. At the closed end of combustion jet 6 adjacent to the apertured partition 8 air supply pipe 9 opens outwardly through which combustion jet 6 is supplied with combustion air, as will be explained below. The combustion air penetrates apertured partition 8 in the form of fine jets and mixes with the exhaust gas coming from pipes 7, in which case the jets of air and the jets of the exhaust gas meet at an angle thus ensuring a fast and good mixing. The arrangement also acts as an injector because the jets of air penetrating the apertured partition are pulled along by the jets of the exhaust gas which have a larger energy of flow so that even, in the case of low pressure of the supplied combustion air, an efficient combustion is ensured.

Further, exhaust gas shell space 2 acts as an expansion chamber for the exhaust gas entering in the form of a pulsating stream because of the pulsating combustion in the internal combustion engine, so that the exhaust gas leaves exhaust gas supply pipes 7 in the form of continuous jets in which case a good muffling is obtained simultaneously by means of the reduction of the pressure waves caused in the expansion chamber.

Front wall 10 of the device is located in an axial direction opposite the open end of combustion jet 6. Front wall 10 simultaneously axially limits exhaust gas shell space 2 and supports ignition device 11 which ignites the exhaust gas/air mixture formed in the combustion jet. For the purpose of heat insulation, front wall 10 is equipped with a ceramic plate 12 at the interior side of the combustion chamber. In the case of idling of the internal combustion engine and thus a low yield of exhaust gas, the afterburning takes place predominantly in the interior of the combustion jet. As soon as larger quantities of exhaust gas occur, as occurs in the case of partial or full load operation, the combustion zone spreads into the space between the open end of combustion jet 6 and front wall 10 or into annulus 13 between combustion jet 6 and the wall of combustion chamber 3 which, because of its size, also ensures a sufficient combustion time.

By means of the high gas temperatures occurring in the combustion chamber during the combustion which, for example, can range from 900° to 1100° C, the combustion jet 6, consisting of fireproof material, is made red-hot. Thus, as a rule, causing a continuous self-ignition of the exhaust gas/air mixture formed in the combustion jet. This makes operation of ignition device 11 during the operation of the afterburning device unnnecessary. Coaxially with respect to combustion jet 6, perforated plate cylinder 14 is located in annulus 13 of combustion chamber 5 which extends from front wall 10 to exhaust gas supply pipes 7. Because of the occurring temperatures, perforated plate cylinder 14 is also made red-hot and serves as a flame holder which prevents an extinguishing of the flame in the casee of partial load operation of the internal combustion engine or in the case of unfavorable operating conditions.

The afterburned exhaust gas flows in annulus 13 between combustion jet 6 and the wall of combustion chamber 3 to the discharge end of the combustion chamber located near the closed end of combustion jet 6. Discharge pipe 15 is connected to the wall of combustion chamber 3 at this end of the combustion chamber. Discharge pipe 15 is tapered in the direction of the flow, and at its small diameter changes into a cylindrical piece of pipe 16. Pipe 16 is, at its downstream end, closed by front wall 17 of the device which prevents a direct discharge of the hot afterburned exhaust gas into the atmosphere. However, the afterburned exhaust gas flows through relatively small openings 18 which are located at the circumference of pipe 16 into ring-shaped collecting chamber 19 surrounding pipe 16 (compare FIG. 2) from which it is discharged, as will be further explained. Allowing the afterburned exhaust gas to emerge from pipe 16, while changing its flow direction, through the small openings 18 which act as restrictors for the gas flow into annulus 19 which in turn acts as an expansion chamber, significantly contributes to the muffling of the exhaust.

As shown in FIG. 1, the whole afterburning device is surrounded by cylindrical housing shell 20 which with exterior pipe 4 of exhaust gas shell space 2 and with outlet pipe 15 of combustion chamber 5 limits shell space 21, which in the axial direction is closed at its end by front wall 10, and at the opposite end is closed by radial wall 22 extending from discharge pipe 15 to housing shell 20. Shell space 21 is supplied with cooling air at its left end, as shown in FIG. 1, through port 23, by a blower which, for example, may be a blower coupled with the internal combustion engine or a thermostatically controlled electrical blower. The cooling air flows to the section of shell space 21 which surrounds discharge pipe 15 in which case it absorbs considerable heat especially in the zone of the cooling air shell which surrounds discharge pipe 15. The heated cooling air is discharged into the atmosphere from shell space 21 through two openings 24, which are formed in housing shell 20 near wall 22.

One part of the cooling air which was, for example, heated to a temperature of 300° C, flows from the cooling air shell zone surrounding discharge pipe 15, while reversing its flow direction, as additional air for combustion through air supply pipe 9 into combustion jet 6.

Figure 2:
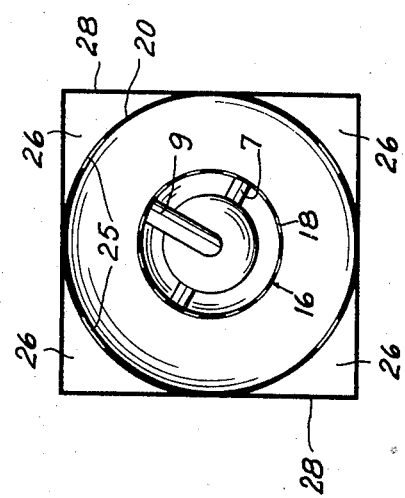
FIG. 2 is a cross-section of the afterburning device taken along line II—II in FIG. 1.

As shown in FIGS. 1 and 2, relatively large rectangular openings 25 are evenly distributed in housing shell 20 limiting annulus 19, along its circumference, through which the afterburned exhaust gas flows out of annulus 19 into four gas guiding ducts 26 having relatively small cross sections, which extend at the exterior side of housing shell 20 to that end of the device which is opposite annulus 19 or to front wall 10, where the afterburned exhaust gas is discharged into the atomphshere, as shown by arrows 27. The ends of ducts 26 which are adjacent to openings 25 are closed.

As shown by FIG. 2, each duct 26, at its interior side, is limited by housing shell 20, and at its exterior side by sheet angle member 28 connected with housing shell 20. By means of this arrangement, a relatively large total heat exchange surface between the afterburned exhaust gas and the cooling air is obtained.

The gas flowing off through ducts 26 over housing shell 20 supplies heat to the counter-flowing cooling air which is carried in shell space 21, and also over sheet angles 28 discharges heat into the atmosphere, so that the temperature of the gas leaving the device at 27 is relatively low, and for example, in the case of full load operation of the internal combustion engine only reaches about 300° C.

In the case of the above described construction of the afterburning device according to the invention, the pre-heating of the exhaust gas to be afterburned and the additional air ensures a good combustion, even if the exhaust gas only contains a small percentage of combustible components. Moreover, a cooling of the combustion chamber is achieved by the heat exchange with the supplied exhaust gas and there is a significant reduction of the temperature of the gases leaving the device as well as of the heat radiation of the device. Since the gas discharge ducts extend along the device, it has a compact structure. By means of the described arrangement of exhaust gas shell space 2, heat reflection from the combustion chamber into the exhaust pipe or to the internal combustion engine is advantageously prevented.

Figure 3:
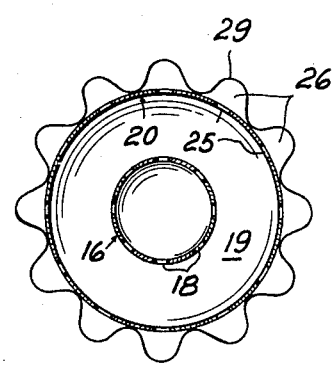
FIGS. 3 to 5, in schematic cross-sections similar to FIG. 2, show three other respective embodiments of the afterburning device according to the invention.

In FIG. 3, another embodiment of ducts 26 for the discharging of the afterburned exhaust gas for the device according to FIGS. 1 and 2 is shown. Housing shell 20 is surrounded by a shell of corrugated metal 29 which is closed upon itself. Corrugated metal shell 29 is connected with the housing shell 20 at the peaks of the corrugations and forms a number of ducts 26 which are separated from each other and which by openings 25 in the housing shell are connected to collecting chamber 19.

Figure 4:
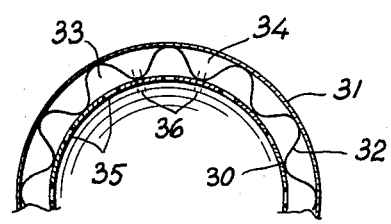
Figure 5:
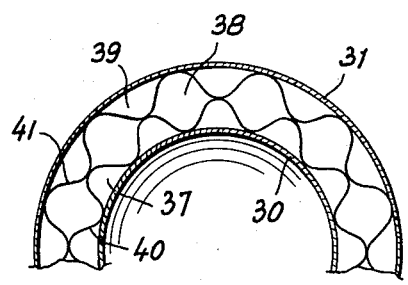

FIGS. 4 and 5 show two other embodiments in cross-section for the arrangement of the ducts for discharging the afterburned exhaust gas. The embodiments according to FIGS. 4 and 5 can be used in connection with the afterburning device shown in FIGS. 1 and 2 as well as in connection with afterburning devices, in which the exhaust gas to be afterburned does not enter into the combustion chamber over shell space 2, but directly, for example, axially.

In the embodiment shown in FIG. 4, the annular space is limited by two coaxial cylindrical pipes 30, 31. In the annular space, corrugated metal shell 32 which is closed upon itself, is connected with the pipes at the peaks of its corrugations to form two channels of ducts 33, 34 which are separated from each other. If the construction according to FIG. 4 is used with an afterburning device in which interior pipe 30 is also the wall of the combustion chamber, and for example, surrounds a tapered discharge pipe of the combustion chamber, the afterburned gas leaving this combustion chamber is expediently discharged over ducts 33 which is partially limited by the interior pipe, while blower cooling air, preferably counterflowing, is directed through the other ducts 34. The afterburned gas flowing out of the combustion chamber discharge pipe enters, possibly over an annulus, through openings 35 in pipe 30 into ducts 33, which are closed near openings 35 and is directed through ducts 33 to the front end of the device which is located away from openings 35, where the cooled gas is discharged into the atmosphere. At the other end of the device, cooling air ducts 34 open into the atmosphere. From cooling air ducts 34, the combustion air can also be taken. For this purpose, ducts 34 can, for example, over openings 36 which are formed at the connection points of the corrugation peaks of corrugated metal shell 32 with interior pipe 30, be connected with the interior of the combustion chamber.

If the construction according to FIG. 4 is, for example, used with the afterburning device shown in FIGS. 1 and 2, a section of interior pipe 30 can, at the same time, form the exterior shell of exhaust gas shell space 2. The arrangement is then expediently made in such a way that cooling air flows in ducts 33 which are partially limited by interior pipe 30, and the afterburned exhaust gas is discharged by ducts 34, in which case the gas from the combustion chamber discharge pipe, through suitable openings, reaches ducts 34, which are formed at the connection points of corrugated metal shell 32 with interior pipe 30. Thus, in the case of the above arrangement, ducts 33 replace cooling air shell space 21 of the construction according to FIG. 1.

In the embodiment according to FIG. 5, a total of three channels of ducts 37, 38, 39 which are separated from each other, are provided in the annulus between cylindrical pipes 30, 31. These duct channels are formed by two evenly shaped corrugated metal shells 40, 41, which are, in their circumferential directions, shifted with respect to each other by essentially half a wave-length in which case, the tops of the corrugations of the corrugated metal shell which face each other, are connected with each other, and the tops of the corrugations of the corrugated metal shells which face away from each other are connected with the interior or exterior of pipe 30 or 31.

Also, the embodiment according to FIG. 5 has different applications. In a preferred application, the afterburned exhaust gas enters over openings (not shown) into the center ducts 38 which are exclusively limited by corrugated metal shells 40, 41. Ducts 38 are formed at the connection points of corrugated metal shell 40 with interior pipe 30. In ducts 37 which are partially limited by interior pipe 30, counter-flowing blower cooling air flows, as in the embodiment according to FIG. 4, while ducts 39 which are partially limited by exterior pipe 31 are supplied with an additional current of cooling air, which is expediently diverted from the blast-pipe discharge before its connection to interior ducts 37. It is understood that the above described feeding of ducts 37 and 39 with cooling air can also be reversed. In the embodiment according to FIG. 5, the secondary air required for the afterburning can also be diverted from the radially interior ducts. The branch current of cooling air in the radially exterior ducts can either be discharged into the atmosphere or be transferred into the main current of cooling air in the radially interior ducts.

The embodiment according to FIG. 5 also makes it possible to use interior ducts 37 for the supply of the exhaust gas to be afterburned to the combustion chamber, for example, instead of to exhaust gas shell space 2 shown in FIG. 1. In this case, the cooling air supplied by the blower flows through the radially disposed exterior ducts 39.

The embodiments according to FIGS. 3 to 5 have the advantage that the ducts for discharging the afterburned exhaust gas and, possibly also the cooling air guiding ducts, can be formed simply and with low requirements for material and expenses.

For the corrugated metal shells, one can, for example, use thin-walled chrome-nickel sheet with a wall thickness of 0.8 mm or less, which also for reasons of light weight proves to be very advantageous. It is understood that all of the described embodiments can also be used in connection with afterburning devices the profile of which does not have a circular shape but is, for example, oval. It is also clear that the corrugated metal sheets can possibly only extend over a part of the circumference of the afterburning device.

In practical applications, the corrugated metal shells are advantageously connected with the pipes and with each other in a form-locking manner. The embodiments shown in FIGS. 4 and 5 can both also be assembled using two prefabricated half-cylindrical shells.

FIG. 6 shows another embodiment of the invention intended for the exhaust system of automobile engines, especially motorcycle engines. The afterburning device is mounted mear curved wheel fender 42 or similar device, in which case combustion chamber 43 which is formed similar to the combustion chamber according to FIG. 1 in a counterflow type construction, is arranged with a vertical axis. At the upper end of combustion chamber 43, the exhaust gas to be afterburned enters from exhaust pipe 44 into annulus 45 and from there flows into combustion jet 46. The afterburned gas which, by means of a wall closing the lower end of the combustion chamber, is prevented from discharging in an axial direction, flows through annulus 47 surrounding combustion jet 46 and discharges over several openings 48 in discharge pipe 49 of the combustion chamber into collecting or expansion chamber 50, which is connected to the side of the combustion chamber. Combustion chamber 43, together with collecting chamber 50 is surrounded by cooling air shell 51, the exterior wall of which has inlet opening 52 for cooling air below the combustion chamber.

As shown in FIG. 6, a section of curved wheel fender 42 forms part of the exterior wall of cooling air shell 51, which faces the bottom side of collecting chamber 50, and which is connection with collecting chamber 49 extends further over wheel fender 42. Collecting chamber 50 opens into several pipes 53 having small diameters, which extend through the part of the cooling air shell which is located in the upper area of the wheel fender for the discharge of the afterburned exhaust gas and opens into the atmosphere at its end, in which case the cooling air shell has exit opening 54 which is separated from the outlet of pipes 53.

Also, in the case of the above described embodiment, the secondary air for the combustion is diverted from the cooling air shell, i.e., the secondary air, as shown in the drawing, at the upper end of combustion chamber 43 axially enters into combustion jet 46 from the cooling air shell. It is clear that the ducts for the discharge of the afterburned exhaust gas can, in the embodiment according to FIG. 6, also be formed by, for example corrugated metal sheets, etc. which are connected with each other.

The above described construction makes it possible because of the formation of the cooling air shell and the arrangement of the cooling air inlet an outlet openings, to possibly operate without a blower. The effect of the cooling air shell is increased by the fact that the wheel fender during the driving of the motor vehicle is subjected to a continuous air circulation.

What is claimed is:

1. Apparatus for the thermic afterburning and muffling of the exhaust gases of internal combustion engines, comprising:
an elongated counterflow combustion chamber receiving the exhaust gases to be afterburned and additional combustion air at its upstream end;
a cooling air chamber encircling said combustion chamber, said cooling air chamber including means for receiving cooling air and means for discharging heated cooling air into the atmosphere, said cooling chamber directing a portion of the heated cooling air into said combustion chamber as said additional combustion air at the upstream end of the combustion chamber;

said combustion chamber including a discharge pipe at the downstream end thereof;

a number of ducts having relatively small cross-sections, being connected to the discharge pipe for discharge of afterburned exhaust gas therefrom, and being separated from one another;

said number of ducts each having a wall forming a joint heat exchange surface with an outer wall of said cooling air chamber such that the ducts are separated from said combustion chamber over their entire length; by said cooling air chamber; and said number of ducts and cooling air chamber separately opening into said atmosphere.

2. Apparatus as claim 1, wherein said number of ducts are evenly distributed about the circumference of the cooling air chamber and extend in an axial direction from the level of the outlet of said discharge pipe essentially parallel to the axis of said combustion chamber to an end thereof which is remote from said discharge pipe, said number of ducts opening into the atmosphere at said end of the combustion chamber and said number of ducts are cooled by cooling air flowing in a counter direction to said exhaust gases.

3. Apparatus as in claim 1, wherein said discharge pipe includes overflow apertures in its circumference and an annular chamber surrounding said apertures, which annular chamber being connected with said number of ducts for the discharge of the afterburned exhaust gas.

4. Apparatus as in claim 1, wherein said number of ducts are mechanically affixed to the exterior wall of said cooling air chamber.

5. Apparatus as in claim 1, wherein said number of ducts are each formed by a corrugated metal shell surrounding said cooling air chamber and the peaks of the corrugations of each of said corrugated metal shells are connected with the exterior wall of said cooling air chamber.

* * * * *